United States Patent [19]
Kambara

[11] Patent Number: 5,511,760
[45] Date of Patent: Apr. 30, 1996

[54] POST INSTALLABLE SELF LOCKING MACHINE LEVELING DEVICE

[76] Inventor: Goro Kambara, 13730 Via Encantado, Valley Center, Calif. 92082

[21] Appl. No.: 147,133

[22] Filed: Nov. 2, 1993

[51] Int. Cl.⁶ ................................................. F16M 13/00
[52] U.S. Cl. .................... 248/650; 248/188.4; 248/677
[58] Field of Search .................... 248/650, 649, 248/354.3, 677, 669, 188.4, 188.3; 52/126.7, 126.4

[56] References Cited

U.S. PATENT DOCUMENTS

| | | | |
|---|---|---|---|
| 944,461 | 12/1909 | Olander | 248/188.4 |
| 1,321,081 | 11/1919 | Behn | 248/188.2 X |
| 2,057,990 | 10/1936 | Whitaker | 248/650 |
| 2,940,784 | 6/1960 | Fell | 248/650 X |
| 3,356,324 | 12/1967 | Attermeyer | 248/650 |
| 3,669,393 | 6/1972 | Paine et al. | 248/188.4 |
| 4,061,298 | 12/1977 | Kober | 248/650 X |

FOREIGN PATENT DOCUMENTS

| | | | |
|---|---|---|---|
| 11579 | 5/1914 | United Kingdom | 248/188.4 |
| 1597339 | 9/1981 | United Kingdom | 248/650 |

*Primary Examiner*—Karen J. Chotkowski

[57] ABSTRACT

Machine leveling device constructed with two bodies (16 and 18) which distance in between can change slightly while maintaining rotational relationship to provide a locking function between the adjusting screw (32) and mounting element (12). The bottom of adjusting screw (32) having convex spherical segment that mates with concave spherical segment of annular disk (38) so that full surface contact is obtained with the mounting surface (40).

6 Claims, 3 Drawing Sheets

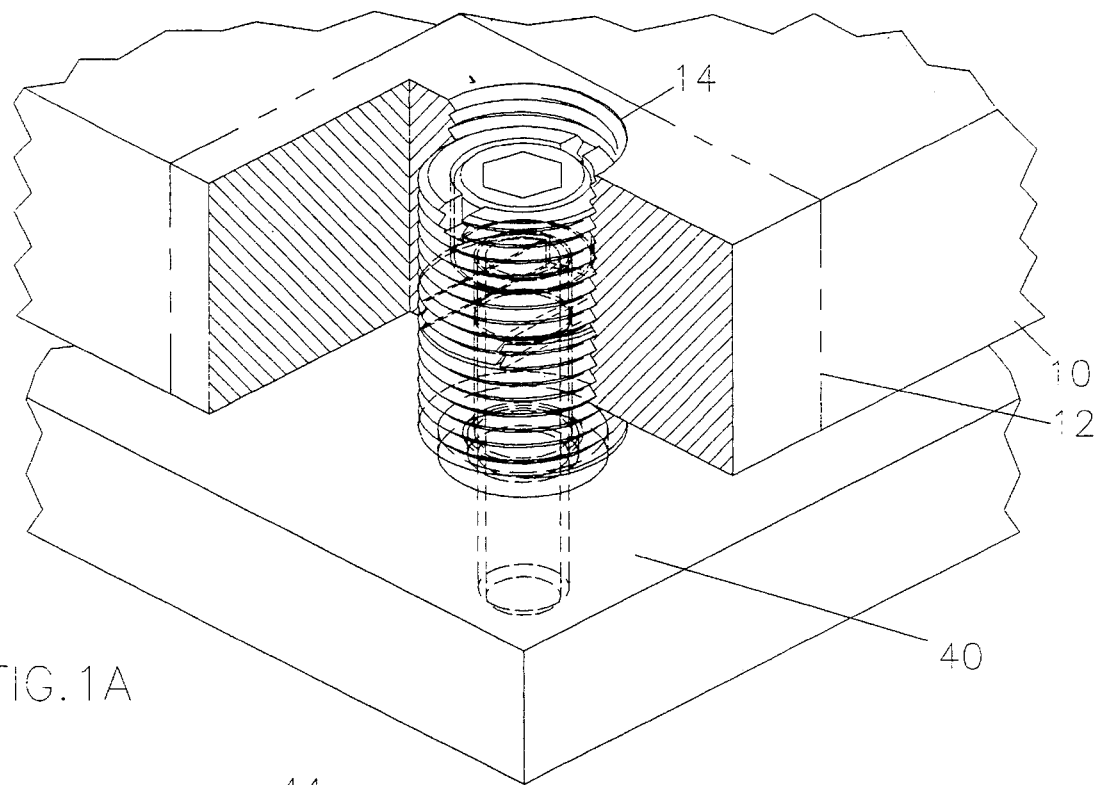
FIG.1A
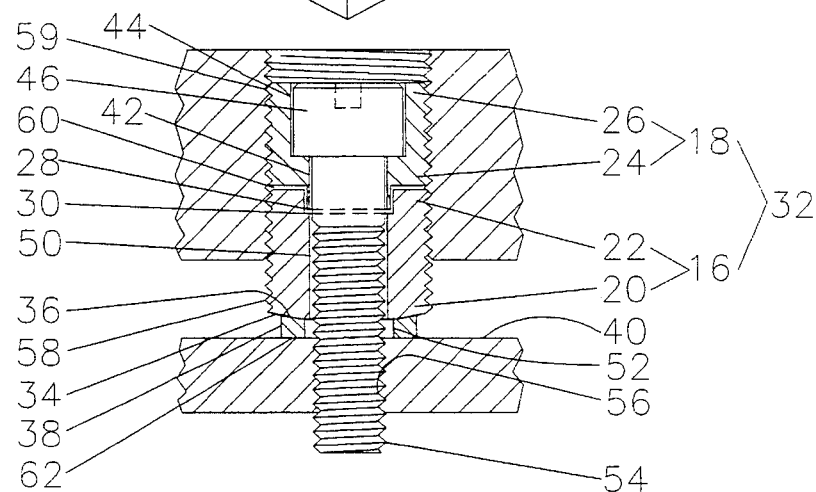
FIG.2A
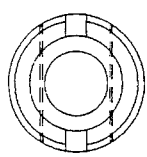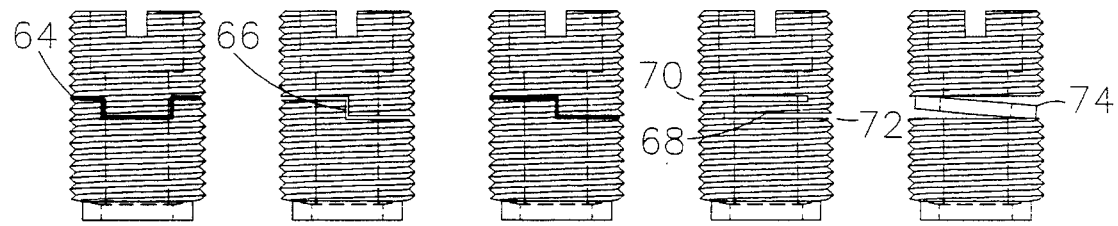
FIG.2B   FIG.2C   FIG.2D   FIG.2E   FIG.2F

POST INSTALLABLE SELF LOCKING MACHINE LEVELING DEVICE

BACKGROUND OF THE INVENTION

1. Field of the Invention

This invention relates to machine supports specifically for leveling and fastening a mechanical apparatus to its support frame and/or to the floor.

2. Description of Prior Art

Leveling of a machine component, base plate and frame becomes necessary if they are to be attached to an imperfect mounting surface and in those circumstances where such items are required to maintain precise relationship with other items or the world. The leveling of such items has been accomplished in various ways. One common procedure is to use spacers and/or shims between the mounting element and the mounting surface. It is however, a time consuming process to provide shims or spacers of proper thickness. Moreover, once the leveled portion of the machine is disassembled, shims and spacers of various height may be lost or mixed up. In such a case, this releveling becomes necessary. A second problem results from the fact that when one surface of a spacer make full contact with either the mounting element or the mounting surface, the other surface seldom makes full contact with its mating surface due to imperfections in construction and the very nature of this leveling method. This leads to unstability and consequent wear or deformation.

Prior hereto, inventors have created several types of leveling devices which do not require shims and spacers of various thicknesses while providing full complementary contact. U.S. Pat. No. 5,104,075 to Freeman (Apr. 8, 1991), and U.S. Pat. No. 4,061,298 to Kober (Jan. 12, 1977) are good examples. Other examples include commercially sold "leveling pads" by Jergens, Inc. 19520 Nottingham Rd., Cleveland Ohio 44110 and Vlier Enerpac 233 Valley Street, Burbank, Calif. 91505. Although all of them provide height adjustment capability without use of shims or spacers and adequate surface contacts, such leveling devices have a number of disadvantages, specifically:

(A) A lock nut and a part of the threaded portion of the rod must extend beyond the surface of the mounting dement. This is generally disadvantageous especially when the mounting dement is a base plate where many components are mounted on top of it. Location of the leveling device becomes a problem in order that any projecting element not obstruct the path of a moving part.

(B) One common solution to the above is to place the lock nut on the underside of the mounting element and maintain the end of threaded rod within the thickness of mounting dement. This solution creates other problems of accessibility to the lock nut and ease of adjustment.

(C) In some situations, it is not practical to have mounting holes located prior to machine placement. The usual procedure is to position the machine, then transfer the hole locations to the mounting surface. Since all known prior art devices do not permit the installation from the top through the hole in the mounting element, the machines have to be removed after marking in order to drill and to tap a thread, thereby resulting in waste of both effort and time.

(D) U.S. Pat. No. 15,104,075 to Freeman (Apr. 8, 1991), and the commercial products mentioned earlier are not suited for hanging applications where the machine is suspended from an upper surface. Those leveling devices are of a construction such that enough material cannot be allocated to prevent the possibility of pull out.

OBJECTS AND ADVANTAGES

Accordingly, several objects and advantages of this invention are:

(A) To provide a leveling device where neither the lock nut nor any part of the threaded portion of the rod extend upward from mounting element.

(B) To provide a leveling device which can be adjusted and locked easily from the top.

(C) To provide a leveling device which will facilitate installation, including the drilling and tapping of threads after the machine is properly located.

(D) to provide a leveling device which will function equally well when inverted so that the machine is suspended from an upper surface.

Further objects and advantages are to provide a leveling device which can be locked securely by tightening only one screw per leveling device and to provide a leveling device which will function as electrical insulator depending upon the choice of materials. Other objects and advantages of this invention will become apparent from a consideration of the ensuing description and drawings.

DRAWING FIGURES

In the drawing, closely related figures have the same number but different alphabetic suffixes.

FIG. 1A is a cutaway perspective showing the relationship between the mounting structure and the elements of the invention.

Figures 3, 4, 5A, 5B, 5C:
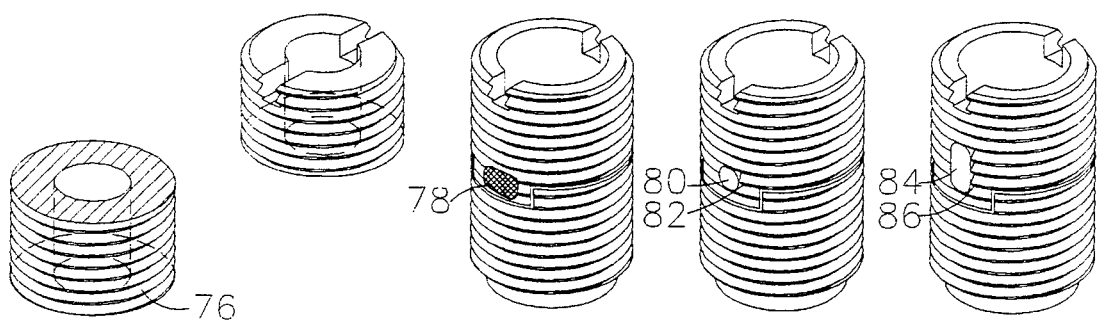
FIG. 3 shows leveling device without surface engaging element of spherical segments.
FIG. 4 shows leveling device without counter bore for the screw head.
FIG. 5A to 5C show three types of thread locking elements: patch, pellet, and strip respectively

Reference Numerals in Drawings 10 base plate
12 mounting element
14 female threaded hole
16 #1 body
18 #2 body
20 first end of #1 body
22 second end of #1 body
24 first end of #2 body
26 second end of #2 body
28 tongue
30 groove
32 adjusting screw -continued

| Reference Numerals in Drawings |
| --- |
| 34 spherical convex segment |
| 36 spherical concave segment |
| 38 annular disk |
| 40 mounting surface |
| 42 screw clearance hole in #2 body |
| 44 counter bore |
| 46 screw head |
| 50 screw clearance hole in #1 body |
| 52 clearance hole in annular disk |
| 54 screw |
| 56 female thread in mounting surface |
| 58 male thread of #1 body |
| 59 male thread of #2 body |
| 60 gap |
| 62 flat surface |
| 64 elastomeric adhesive |
| 66 rabbet joint |
| 68 flexible member |
| 70 slot |
| 72 slot |
| 74 flexible member |
| 76 flat surface |
| 78 patch of plastic wedging material |
| 80 pellet of plastic wedging material |
| 82 blind hole |
| 84 strip of plastic wedging material |
| 86 groove |
| 88 thinner mounting element |
| 90 adapter bushing |
| 92 bushing spacer |
| 94 threaded bore |
| 96 male thread |
| 98 female thread |
| 100 hexagon |
| 102 blind holes |
| 104 grooves |
| 106 knurlings |
| 108 concrete floor |
| 110 washer |
| 112 concrete anchor |

DETAILED DESCRIPTION OF A PREFERRED EMBODIMENT

The operation and advantages of the present invention will be best understood by reference to the drawings. It will be recognized however, that although not expressly shown herein, the invention includes equivalent structures in which the apparatus mounts in a horizontal, inclined or inverted orientation.

A typical preferred embodiment is shown in the perspective cutaway view in FIG. 1A and the sectioned view of FIG. 2A. A base plate 10 comprises a surface to which mechanical apparatus (not shown) are to be mounted and requires leveling. In this configuration a portion of base plate 10 is also a mounting element 12. Base plate 10 has one or more mounting elements 12, each having a female threaded hole 14 and an adjusting screw 32 which consist of a #1 body 16 with a first end 20 pointed down and a second end 26 point up and a #2 body 18 with a 1st end 24 pointed down and a 2nd end 26 positioned up to engage with female threaded hole 14 via male thread 58 of #1 body 16 and a male thread 59 of #2 body 18 while they are coupled together with a tongue 28 which is a part of first end 24 of #2 body 18 and a groove 30 which is a pan of second end 22 of #1 body 16. Preferably the height of tongue 28 is same as the depth of groove 30 and is about two thread pitch lengths of threads 58 and 59 of adjusting screw 32 or longer. A gap 60 between the ends 22 and 24 is more than twice the axial free play distance between female thread 14 and male thread 58 so as to assure that the two ends 22 and 24 do not touch each other under load. Gap 60 is sufficiently small to enable tongue 28 to effectively engage with groove 30 so as to transmit the load from #2 body 18 to #1 body 16 when//2 body 18 is turned. First end 20 of #1 body 16 has a spherical convex segment 34 which engages with a complementary spherical concave segment 36 of annular disk 38. Annular disk 38 has a flat under surface 62 and rests against mounting surface 40. #2 body 18 has a screw clearance hole 42 and a counter bore 44 which diameter has a screw clearance hole 50. Annular disk 38 has a slightly larger clearance hole 52 compared to clearance holes 42 and 50 since the radial location of annular disk 38 has to change in order to accommodate the angular imperfection in mounting surface 40. Screw 54 extends through #2 body 18, #1 body 16 and annular disk 38 then engages with a female thread 56 in mounting surface 40. Second end 22 of #1 body 16 has two or more radial slots so as to facilitate the insertion of a tool to turn adjusting screw 32.

Operation

Adjustment of distance between mounting element 12 and mounting surface 40 is accomplished by mining adjusting screw 32. Locking of adjustment screw 32 to mounting element 12 is automatically accomplished by tightening screw 54 because the resulting force is transmitted to the bodies 16 and 18 via male threads 58 and 59 forcing the elements in opposite directions of one another so as to produce a locked condition. Annular disk 38 will bridge between the spherical convex segment 34 and flat mounting surface 40 within the movement allowed by the gap between hole 52 and the diameter of screw 54. The total adjustment distance is equal to: (thickness of mounting element 12)—(height of tongue 28)—(distance of gap 60)—(minimum thread engagement distance required for #1 body 16)—(minimum thread engagement distance required for #2 body 18).

ADDITIONAL EMBODIMENTS AND FEATURES

Additional embodiments are shown in side and top views in FIG. 2B, 2C, 2D, 2E and 2F.

FIG. 2B shows exactly the same part as FIG. 1 except gap 60 is filled with a elastomeric adhesive 64 so as to make the two bodies 16 and 18 into one assembly while male threads 58 and 59 are forming one continuous thread with proper gap in between two bodies 16 and 18 for ease of handling and assembly.

FIG.2C and FIG. 2D are similar to FIG. 2A and 2B respectively except tongue 28 and groove 30 are replaced with a rabbet joint 66.

FIG. 2E shows adjusting screw 32 made out of one piece material with a flexible member 68 created by a set of transversely made overlapping slots 70 and 72 which openings are opposite to each other and axially spaced a certain distance apart to allow axial movement.

FIG. 2F shows adjusting screw 32 as a three piece weldment consisting of #1 body 16, a flexible member 74 and #2 body 18. Flexible member 74 is a thin annular disk having an outside diameter smaller than female thread 14 so as to avoid interference, and an inside diameter slightly larger than the diameter of screw 54. A portion of one end of flexible member 74 is welded to first end 24 of body 18 and the diagonally opposite end is welded to second end 22 of #1 body 16 with flexible member 74 angularly slanted to create gaps in between so as to allow axial movement.

FIG. 3 shows only the bottom portion of #1 body 16 where #1 body 16 has a flat surface end 76 (but without annular disk 38) for an application where there is no need for an extra complementary engaging device.

FIG. 4 shows only the top portion of #2 body 18 to illustrates the #2 body 18 without counter bore 44 for an application where there is no need for eliminating a projection above mounting element 12.

FIG. 5A, 5B and 5C show three variations of thread locking elements to keep adjusting screw 32 from inadvertently turning in female thread 14 within mounting element 12 when screw 54 is not tightened. This will facilitate detaching mounting element 12 from mounting surface 40 without changing the already established distance.

FIG. 5A shows a patch of plastic wedging material 78 coated on thread 59 close to end 24 of #2 body 18. FIG. 5B shows a pellet of plastic wedging material 80 inserted in a blind hole 82 which is made in thread 59 close to end 24 of #2 body 18. FIG. 5C shows a strip of plastic wedging material 84 inserted in a longitudinally made groove 86 in the thread 59 close to end 24 of #2 body 18.

Figure 1B:
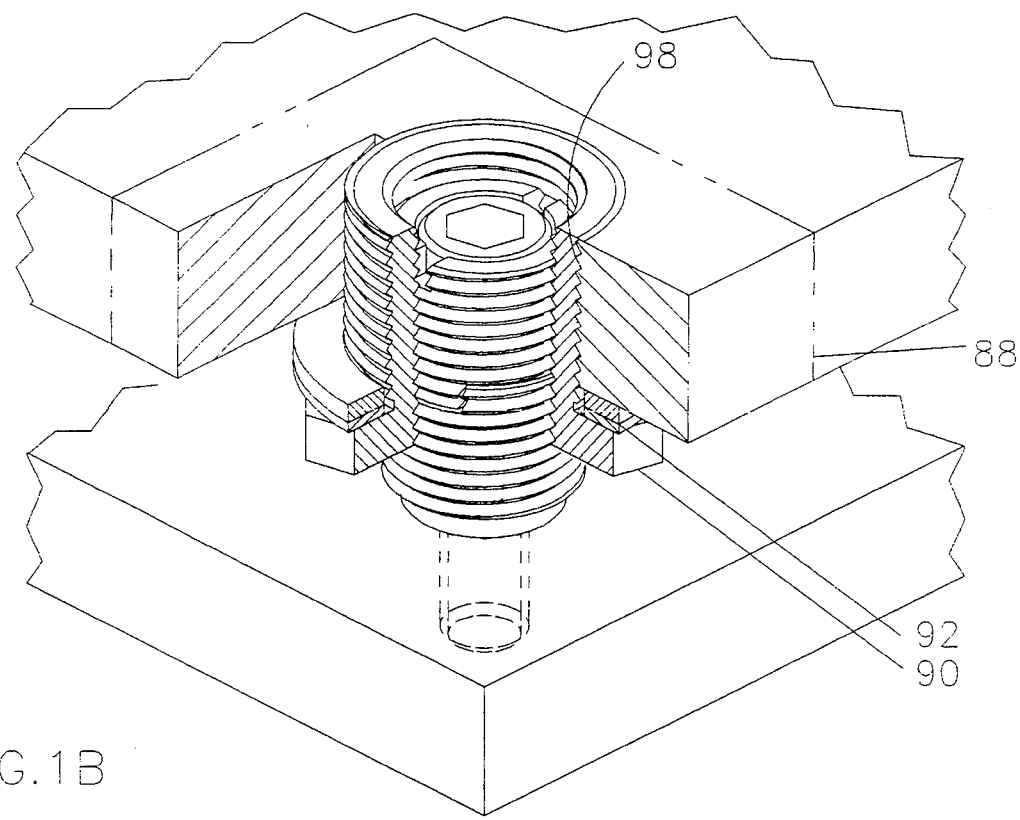
FIG. 1B shows the inner base plate application than normal with adapter and spacer to obtain same results from normal application FIG. 2A to 2F how various ways to accomplish the same function of leveling device.
Figures 6A, 6B, 6C, 6D:
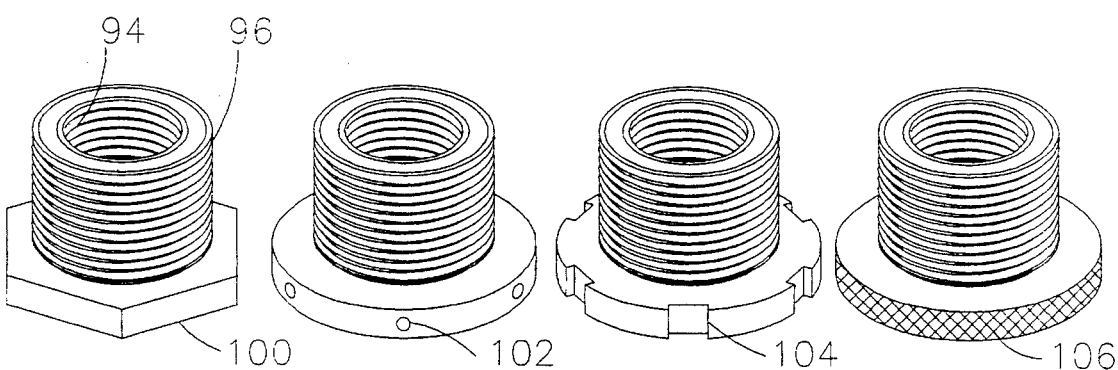
FIG. 6A to 6D show four types of turning elements: polygon, holes, grooves, and knurl.
Figure 8:
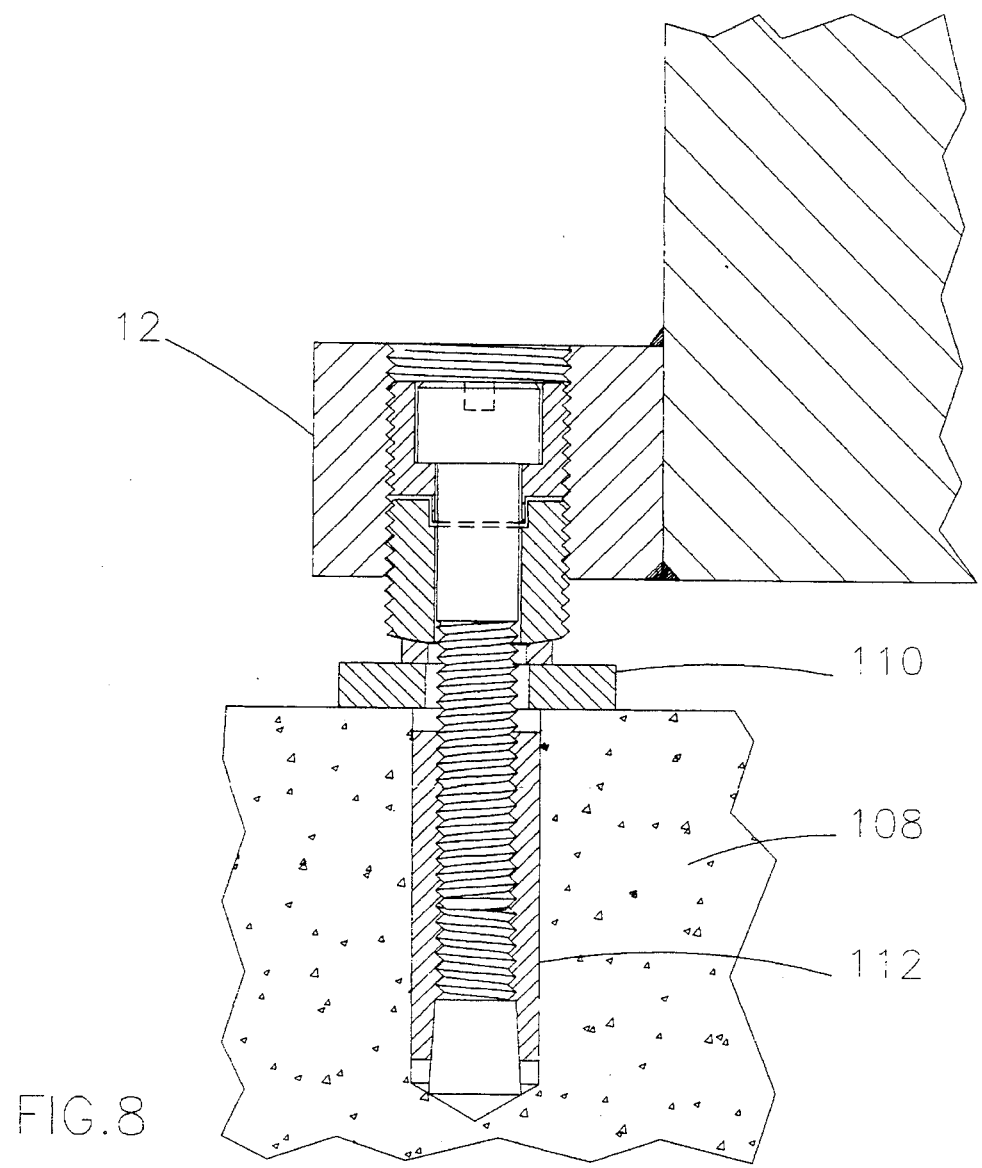
FIG. 8 shows installation to the concrete floor.
Figure 7A:
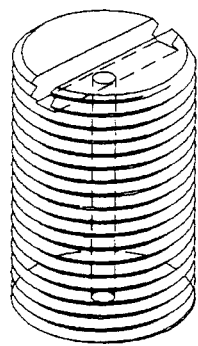
Fig. 7A to 7C show three types of drill bushings: pilot drill bushing, tap drill bushing, and concrete anchor drill bushing.
Figure 7B:
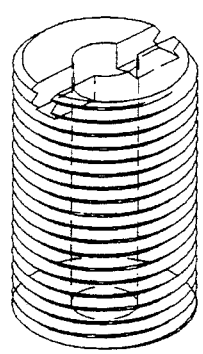
Figure 7C:
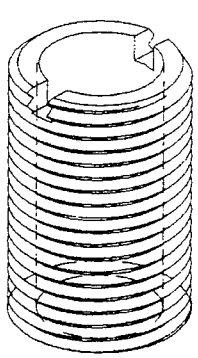

FIG. 1B shows an application where mounting element 88 is thinner than the mounting element designed for the leveling device. Since the adjustment distance obtainable is, to a certain degree, related to the thickness of the mounting dement, an adapter bushing 90 is utilized to increase the thickness of the mounting element so as to obtain a greater adjustment distance. A plurality of bushing spacers 92 shown here are used to space the distance between the mounting element and the turning elements of adapter bushing 90 so as to avoid the necessity of making adapter bushings of various kinds in order to match mounting dement thicknesses of variations kinds. In FIG. 6A adapter bushing 90 has a threaded bore 94 through its center and accepts male threads 58 and 59 of #1 body 16 and #2 body 18 respectively. The outside surface consists of two features, namely an upper portion comprising a male thread 96 which engages with female thread 98 of mounting dement 88 and a lower portion formed in the shape of a hexagon 100 with its distance across flats greater than the diameter of male thread 96. There are various possibilities with regard to the shape of the turning elements. Thus in FIG. 6B the outside surface is cylindrical with periodically and radially made blind holes 102. FIG. 6C shows periodically and longitudinally made grooves 104 to accept a conventional hook spanner. FIG. 6D shows knurlings 106. FIG. 7A, 7B and 7C show various drill bushings each adapted to screw into the female threads 14 in mounting dement 12 or threaded bore 94 for purpose of guiding the drill bit to drill pilot hole (shown in FIG. 7A) and tap drill hole (shown in FIG. 7B) in mounting surface 40 with preciseness in location and perpendicularity to mounting element 12. FIG. 8 shows an application where the leveling device is mounted directly to a concrete floor 108 with a washer 110, and a female threaded concrete anchor 112. The drill bushings shown in FIG. 7C are used to guide the drill bit to drill concrete anchor holes in concrete floor 108. From the description above, a number of advantages of my leveling device becomes evident.

(A) The adjusting screw is made of two bodies with coupling elements inbetween.

The locking is accomplished within, there is no need for a lock nut, enabling better utilization of base plate surface since only one screw has to be tightened.

(B) Height adjustment and locking of leveling device is done easily from top.

(C) All the tools e.g. pilot drill bushing, tap drill bushing and concrete anchor drill bushing, and all the components namely annular disk, adjustment screw, and screw, can be inserted from the top (washer 110 can go in from the side) so there is no need to remove the machine to drill holes and to provide engagement elements when installing the leveling devices.

(D) Since the screw goes through the leveling device into the mounting surface the pull out strength depends upon the tensile strength of the screw and not upon the strength obtained by staking of metal which can be seen in the commercially available leveling pads mentioned.

(E) The adjusting screw can be made out of electrically non conductive material like plastic to use this device as an electrically isolated leveling device.

SUMMARY RAMIFICATIONS, AND SCOPE

Accordingly, it will be understood that the leveling device of this invention can be used to level a machine easily and surely and can be reinstalled without re-leveling after removal of the base plate. Furthermore, this leveling device has additional advantages in that.

It can be installed anywhere since it has no projecting components which would interfere with other elements.

It permits the adjusting and locking of the leveling device from the top.

It permits the installation of leveling devices after the machine is placed into the fight location.

It permits the installation of the leveling device up-sidedown in a hanging application of the base plate with the same security as if installed fight-side-up.

Although the description above contains many specificities, these should not be construed as limiting the scope of the invention, but as merely providing illustrations of the various embodiments. For example, the leveling device can have more slots for attaching a tool to turn than shown here, the thread locking dement can be of other types, tongue and groove in between two bodies can be dowell pins and holes, etc. It will thus be understood that the embodiments described are exemplary only and that numerous changes, modifications and substitutions may be made without departing from the spirit of the invention.

I claim:

1. A machine leveling device comprising:

(A) a mounting dement for a machine that requires leveling having a female thread therethrough, (B) a screw, (C) a mounting surface having a female threaded hole to engage with said screw, (D) adjusting screw means for adjusting the distance between said mounting element and said mounting surface having a succession of two elongated cylindrical male threaded bodies, #1 body and #2 body each body having a first end and a second end and wherein is included:

(D1) coupling means in between said second end of said #1 body and said first end of said #2 body for connecting said two bodies rotationally while allowing an axial movement engagement with said female threaded bore with said coupling means within said mounting element;

(D2) a plurality of radial slots for attaching a tool for rotation of said adjusting screw means at said second end of said #2 body; and (D3) surface engaging means for mounting said adjusting screw means to said mounting surface at said first end of said body (D4) centrally located bore therethrough which bore has a diameter larger than the diameter of said screw;

whereby said machine leveling device is capable of adjusting and locking the distance between said mounting element and said mounting surface by turning said adjusting screw means and tightening said screw while said surface engaging means provides full complimentary contact;

(E) and further including an adapter bushing means for providing an equivalent adjustment distance for thin mounting elements, said adapter bushing means having an annular body and center bore having a female thread to engage with said adjusting screw means and a male threaded portion and an enlarged end portion, said enlarged end portion including:

(E1) turning means for attaching a tool to facilitate installation into a female threaded hole of corresponding size in said thinner mounting element;

(F) and further including:

(F1) spacer means for occupying the space between said turning means of said adapter bushing means and said mounting element.

2. The leveling device of claim 1 Wherein said turning means are selected from the group consisting of polygon, periodically and radially made blind holes, Periodically and longitudinally made grooves, and knurlings.

3. The leveling device of claim 1 wherein said coupling means are selected from the group consisting of a tongue and groove joint, a tongue and groove joint with elastomeric adhesive in between to connect them with predetermined gap, a rabbet joint, rabbet joint with elastomeric adhesive in between to connect them with predetermined gap, a flexible member created by a set of transversely made overlapping slots which openings are opposite to each other and axially predetermined distance apart, an annular flexible disk wherein a portion of one end is welded to said first end of said #2 body and diagonally opposite end is welded to said second end of said #1 body with predetermined gap in between.

4. The leveling device of claim 1 further comprising thread locking means for keeping said adjustable screw means from turning in said female threaded hole of said mounting element unintentionally while said screw is not tightened, said thread locking means to be placed on the outside surface of said thread at and around said coupling means and to be selected from the group consisting of a patch of plastic wedging material coated on said thread, a pellet of plastic wedging material inserted in a blind hole in said thread and a strip of plastic wedging material inserted in a longitudinally made groove in said thread.

5. In a machine leveling device of the type having a, pair of externally threaded cylindrical elements for cooperatively engaging with a threaded hole in a mounting surface, the improvement which comprises:

coupling means for transmitting a rotational motion between said pair of externally threaded cylindrical elements whereby said pair of cylindrical elements may be caused to linearly advance or withdraw in unison with respect to the threaded hole in the mounting surface when either of said externally threaded cylindrical elements is rotated, and wherein said coupling means comprises:

at least one protruding structural element and at least one mating recess between said pair of externally threaded cylindrical elements, said protruding element and said mating recess being positioned to engage one another so as to transfer torque between said pair of externally threaded cylindrical elements.

6. The apparatus recited in claim 5 wherein is included:

spacer means between said pair of externally threaded cylindrical elements for maintaining a predetermined gap when said pair of externally threaded cylindrical elements are inserted into the mating threads of a mounting hole.

* * * * *